UNITED STATES PATENT OFFICE 2,742,375
Patented Apr. 17, 1956

2,742,375

PROCESS OF PRODUCING HYDROPHOBIC, ORGANOPHILIC PIGMENTS

Theodore F. Cooke, Martinsville, and John W. Eastes, Somerville, N. J., assignors to American Cyanamid Company, New York, N. Y., a corporation of Maine No Drawing. Application February 5, 1953, Serial No. 335,404

5 Claims. (Cl. 106—308)

This invention relates to improved pigments and to a process of producing the same. More particularly, the present invention is concerned with the preparation of pigments having improved hydrophobic and organophilic properties which make them very valuable pigments for use in lithographic printing inks, paints, enamels, etc.

Lithographic inks are customarily prepared by incorporating the pigment into a lithographic varnish. The resulting paste is ground and the finished ink is thereafter aged.

In lithography, the surface of the printing stone must be wet with a wetting solution, usually termed lithographic fountain solution, for each impression before the ink is applied in order to prevent the ink from adhering to the non-reproducing portions of the surface. When moistened stone is thereafter inked in the usual manner the ink adheres to the greasy or oily portion of the stone and is repelled from the moist or wet portions of the stone. The pigment used in such inks, since it must have a strong affinity for the greasy design, must be preferentially wet with hydrocarbons (organophilic) and since it must have no affinity for the wet portions of the stone it must be water-repellent (hydrophobic). Moreover, because the fountain solution usually contains a small amount of acid in order to etch the surface of the stone slightly so as to keep the lines sharp, it is extremely important that the lithographic ink have resistance to breakdown by the fountain solution as otherwise the ink is too bodied for proper flow or there is bleed and disintegration of the ink.

We have discovered a novel method of treating pigments so as to impart thereto greatly improved hydrophobic and organophilic properties which make them especially suitable for use in lithographic inks.

Essentially, the present invention comprises coating the pigment particles with a small amount of a high molecular weight pyridinium chloride, more particularly, with a compound of the group consisting of cetyl oxymethyl pyridinium chloride, stearyloxymethyl pyridinium chloride, "Stenol" oxymethyl pyridinium chloride and stearamidomethyl pyridinium chloride. The preparation of the high molecular weight pyridinium chlorides referred to forms no part of the present invention and they may be prepared by methods known to the art. For example, cetyloxymethyl pyridinium chloride of the formula:

may be prepared by reaction of the chloromethyl ether of the alcohol with pyridine, the chloromethyl ether having been prepared from the alcohol, paraformaldehyde and dry HCl in benzene. Similarly, a corresponding compound can be prepared from a long chain fatty alcohol sold under the trade-name "Stenol," the major component of which is believed to be a $C_{18}$ alcohol, therefore, as used herein the term "Stenol" oxymethyl pyridinium chloride refers to a compound of the formula

wherein R is derived from "Stenol." Stearamidomethyl pyridinium chloride of the formula:

may be prepared by reacting suitable proportions of stearamide, paraformaldehyde, pyridine, and excess dry HCl. Stearyloxymethyl pyridinium chloride of the formula:

may be prepared by reaction of stearyl chloride, paraformaldehyde and pyridine.

In carrying out the present invention, the pigment is preferably slurried in an aqueous system including one of the aforementioned pyridinium chlorides, is thereafter filtered and then dried. Because the aforementioned pyridinium chlorides are heat-reactive it is an essential feature of the present invention that the treated pigment be heated in order to develop the hydrophobic, organophilic properties of the applied coating. In order to produce a strongly hydrophobic pigment it is preferred to heat the thus treated pigment for about 5 to 30 minutes at a temperature of about 100° C. to 200° C. Heating the treated pigment at this temperature has been found to produce an extremely water-repellent pigment that is also organophilic, that is, it is preferentially wet with hydrocarbons.

The present invention is not to be confused with a prior proposal wherein pigments are treated with cationic agents, among them being certain aliphatic long chain quaternary ammonium compounds to obtain flocculation of the wet press cake in order to improve filtration and softness of the pigment. In this prior art proposal, the resulting pigment is not water-repellent but is quickly wet with water whereas the pigments of the present invention when treated with the heat-reactive agents of the present invention and then heated at the stated temperature are very hydrophobic.

The pigment resulting from the heat-treatment process of the present invention is extremely hydrophobic, satisfactorily organophilic and possesses good resistance to lithographic fountain solution. The final product consists of loosely-bound pigment particles coated with the coating composition and the mass is readily disintegrated to yield discrete particles of pigmentary dimensions and as such is suitable for direct use as a pigment. The coating is strongly adherent and is not removed when the pigment is ground in vehicles to provide a lithographic printing ink. The improved pigments of the present invention are exceedingly water-repellent as evidenced by the fact that some 600+ seconds are required for wetting with water whereas similar untreated pigments are wet almost instantly upon exposure to water. Moreover, the pigments of the present invention are very readily wet by organic vehicles of the lithographic varnish type and as such are selectively retained by the lithographic ink. The adherent coating is permanent in character and is not removed or attacked by the acidic lithographic fountain solution as evidenced by the fact that lithographic inks made from the treated pigments do not undergo any bleed or distintegration after complete incorporation into a lithographic fountain solution.

The pigments of the present invention are also useful in emulsion paints, i. e., aqueous emulsions of film-forming materials. In order to obtain an emulsion of a pigmented organic film-forming material which will dry to a glossy film it is necessary that the pigment be present entirely in the oil phase as any pigment in the water phase is deposited on the surface of the film and produces a flat surface when the water evaporates. Since the pigments of the present invention are both hydrophobic and organophilic, it is evident that they permit the formulation of emulsified oil paints which will dry to a glossy film.

The pigments of the present invention are permanently water-repellent due to a chemical reaction between certain groups on the pigment and the pyridinium chlorides. Solvent extraction of the treated pigment reduces the water-repellency of the pigment very slightly with the removal of a wax-like material. X-ray diffraction examination of the treated pigment shows no change in crystal structure from that of the untreated pigment. On the other hand, however, electron diffraction examination and infrared examination show no chloride groups as such on the treated pigment.

The heat-treated pigments of the present invention are extremely resistant to wetting with water whereas untreated pigments are almost instantly wet with water. In addition, the treated pigments are easily and preferentially wet with hydrocarbons. For example, when a mixture of heat-treated pigment and toluene is shaken with water the pigment stays in the toluene phase or collects at the toluene-water interface and does not go into the water phase as the untreated pigment readily does.

The water-repellency of the treated pigments is in proportion to the amount of pyridinium chloride applied. A distinctly water-repellent pigment is obtained when the weight of the pyridinium chloride is as little as 0.5%. It is preferred, however, that the pigment contain from about 3% to 10% by weight as in this range the pigment exhibits very satisfactory water-repellence and resistance to lithographic fountain solution.

The invention includes the use of the above-mentioned pyridinium chlorides for treating pigments in order to render them hydrophobic and organophilic and is applicable to such pigments as titanium dioxide of either the rutile or the anatase crystalline form, ultra-marine blue, iron blue, lead chromate, known commercially as chrome yellow. The invention is also applicable to the treatment of organic pigments such as vat pigments, for example, 5,5-dichloro-7,7'-dimethyl - 2,2' - bisthionaphthene indigo, known commercially as vat violet, and azo pigments, for example meta-nitroparaanisidine coupled with the nitranilide of 2-hydroxy-3-naphthoic acid, known commercially as maroon toner.

It is to be understood that when reference is made to stearamidomethyl pyridinium chloride, this refers not only to the pure compound as such but to products made from commercial stearamides which contain other amides than stearamide. Similarly, "Stenol," commercial cetyl alcohol, etc. are comprised of mixtures of various fatty alcohols. Such mixtures as well as the pure compounds are useful and are included within the scope of the present invention.

The invention will be described in greater detail in conjunction with the following specific examples in which the parts are by weight unless otherwise specified.

*Example 1*

20 parts of stearyloxymethyl pyridinium chloride were dispersed in 125 parts of water at 70–75° C. 4 parts of sodium acetate dissolved in 51 parts of water were added to the stearyloxymethyl pyridinium chloride dispersion. 100 parts of ultramarine blue were then added to the dispersion and the slurry was stirred for 1 hour. It was then evaporated to dryness up to 70° C. for 3 hours using 20 mm. mercury pressure. The soft powder was then heated at 140° C. for 20 minutes. The resultant product was tested for water-repellency as follows: 2 parts of the heat-treated pigment were formed into a paste with 4 parts of water until wet. The elapsed time to wet the pigment was 110 seconds whereas a similar but untreated ultramarine blue pigment wet practically instantaneously. The resultant pigment was also organophilic, being preferentially wet with toluene in a toluene-water system.

*Example 2*

20 parts of cetyloxymethyl pyridinium chloride were mixed with 180 parts of water and heated to 62° C. to get a smooth emulsion. 100 parts of ultramarine blue were added and the mixture was agitated for 1 hour. The mixture was then cooled and evaporated to dryness in vacuo. At this point the pigment was quickly wet by water and remained in the aqueous phase when shaken in a toluene-water system. The treated pigment was then heated at 140° C. for 1 hour and cooled. After the heat treatment process the product was extremely hydrophobic and when wet with water and shaken with toluene the pigment went at once into the toluene phase.

*Example 3*

125 parts of water and 20 parts of stearyloxymethyl pyridinium chloride were heated to 70° C. with stirring until a smooth emulsion was obtained. 4 parts of sodium acetate were dissolved in 51 parts of water which was added to the emulsion and an additional 200 parts of water were added. 275 parts of iron blue press cake containing 29.6% dry solids were added gradually with stirring. To maintain the proper stirring consistency an additional 100 parts were added while the iron blue was being added to the emulsion. The mixture was thereafter evaporated to dryness slowly in vacuo at a temperature up to 95° C. using 20 mm. mercury pressure. The dry powder was then heat treated at 145° C. for 20 minutes, cooled and ground. The heat treated product was markedly hydrophobic whereas a similar but untreated iron blue wet easily when tested by the procedure set forth in Example 1.

*Example 4*

200 parts of water and 10 parts of cetyloxymethyl pyridinim chloride were heated to 60° C. with stirring. 100 parts of lead chromate were added and the mixture was cooled to 30° C. with constant stirring. The mixture was then evaporated to dryness in vacuo up to 95° C. with 20 mm. mercury pressure. The pigment was then heated for 20 minutes at 145° C. The resultant product when tested by the procedure outlined in Example 1 was extremely hydrophobic whereas a similar but untreated lead chromate wet easily.

*Example 5*

200 parts of water and 10 parts of cetyloxymethyl pyridinium chloride were heated to 60° C. with stirring. 100 parts of the pigment prepared from meta-nitroparaanisidine coupled with the nitranilide of 2-hydroxy-3-naphthoic acid were added to the dispersion and the mixture was stirred for 30 minutes. The mixture was evaporated to dryness up to 95° C. in vacuo at 20 mm. mercury pressure. The resultant product was heated for 20 minutes at 145° C. The soft powder, when tested by the procedure outlined in Example 1, was water-repellent whereas a similar but untreated pigment wet easily.

*Example 6*

200 parts of water and 10 parts of cetyloxymethyl pyridinium chloride were heated to 60° C. with stirring. 100 parts of 5,5'-dichloro-7,7'-dimethyl-2,2'-bisthionaphthene indigo were added and the mixture was stirred. An additional 25 parts of water were added in order to thin the paste and the stirring continued for 30 minutes. The mixture was then evaporated to dryness in vacuo. The pigment was then heated for 30 minutes at 150° C. The resultant pigment when tested by the procedure outlined in Example 1 was very hydrophobic whereas a similar but untreated pigment wet easily.

*Example 7*

5 parts of stearamidomethyl pyridinium chloride were agitated in 300 parts of water at 60° C. 100 parts of ultramarine blue were added and the stirring was continued for 45 minutes while cooling to 30° C. The treated pigment was filtered off and the filter cake was dried in vacuo up to 95° C. using 10 mm. mercury pressure. The filter cake was heated at 140–145° C. for 20 minutes.

The resultant product was a soft flufly powder, which when tested by the procedure outlined in Example 1, required 866 seconds to wet whereas a similar but untreated ultarmarine blue pigment wet practically instantaneously.

*Example 8*

5 parts of stearamidomethyl pyridinium chloride were stirred in 200 parts of water and heated at 60° C. to obtain a uniform suspension. 100 parts of titanium dioxide were added and the stirring was continued for 2 hours. The mixture was then cooled to room temperature and was thereafter evaporated to dryness in vacuo up to 95° C. with 10 mm. mercury pressure. The pigment was thereafter heat treated at a temperature of 140° C. for 30 minutes. The resultant pigment when tested by the procedure outlined in Example 1 was very hydrophobic whereas a similar but untreated titanium dioxide was quite hydrophilic.

*Example 9*

3 parts of "Stenol" oxymethyl pyridinium chloride were agitated with 300 parts of water and heated to 60° C. for 30 minutes in order to obtain a good dispersion. 100 parts of ultramarine blue were added and the stirring was continued until the temperature dropped to 30° C. The mixture was filtered, dried in vacuo up to 95° C. using 25 mm. mercury pressure. The pigment was thereafter heat treated at 140° C. for 3 minutes. The resultant pigment was tested for water-repellency by the procedure set forth in Example 1, required 515 seconds to wet whereas a similar but untreated ultramarine blue wet practically instantaneously.

*Example 10*

10 parts of "Stenol" oxymethyl pyridinium chloride and 300 parts of water were agitated and heated at 60° C. to obtain a good dispersion. 100 parts of titanium dioxide of the ink type were added and the mixture was stirred while cooling to room temperature. The mixture was then dried in vacuo up to 95° C. at 30 mm. mercury pressure. The resultant product when tested by the procedure outlined in Example 1 required 128 seconds to wet whereas a similarly-treated titanium dioxide but which had not been heat treated, wet in 25 seconds.

*Example 11*

5 parts of stearamidomethyl pyridinium chloride and 2.5 parts of cetyloxymethyl pyridinium chloride were agitated in 300 parts of water at 60° C. 100 parts of ultramarine blue were added and the stirring was continued for 45 minutes while cooling to 30° C. The treated pigment was filtered off and the filter cake was dried in vacuo up to 95° C. using 10 mm. mercury pressure. The filter cake was heated at 140–145° C. for 20 minutes. The resulting product was a soft fluffy powder which was extremely difficult to wet with water.

*Examples 12–15*

Lithographic printing inks were prepared from each of the pigments resulting from the treatments specified in Examples 1, 2, 7 and 9 by grinding 36 parts of the pigment in 24 parts of No. 1 lithographic varnish. 20 parts of the resulting ink and 50 parts of lithographic fountain solution composed of 1000 parts of water, 1.3 parts of potassium acid tartrate, 10.2 parts of $Zn(NO_3)_2 \cdot 6H_2O$ and 18.4 parts of gum arabic, the solution having a pH of 3.4–3.8, were placed in a mechanical mixer having rotating and intermeshing blades and run for 10 minutes so as to test the resistance of the ink to the fountain solution. Observations were then made for loss of flow, bleed and disintegration of the inks. These observations indicated that the inks prepared with the treated pigments had satisfactory resistance to the lithographic fountain solution in that there was no bleed nor disintegration of the inks and the loss of flow was very slight.

We claim:

1. The method of producing a hydrophobic, organophilic pigment which comprises slurrying the pigment in a solution of at least one high molecular weight pyridinium chloride of the group consisting of cetyloxymethyl pyridinium chloride, stearlyoxymethyl pyridinium chloride, "Stenol" oxymethyl pyridinium chloride and stearamidomethyl pyridinium chloride, drying the pigment, and heating the pigment at a temperature of about 100° C. to 200° C. for at least 5 minutes to develop the hydrophobic, organophilic properties of the pyridinium chloride.

2. The method according to claim 1 wherein the pyridinium chloride is cetyloxymethyl pyridinium chloride.

3. The method according to claim 1 wherein the pyridinium chloride is stearyloxxymethyl pyridinium chloride.

4. The method according to claim 1 wherein the pyridinium chloride is "Stenol" oxymethyl pyridinium chloride.

5. The method according to claim 1 wherein the pyridinium chloride is stearamidomethyl pyridinium chloride.

References Cited in the file of this patent

UNITED STATES PATENTS

| Number | Name | Date |
|---|---|---|
| 2,192,956 | Sloan et al. | Mar. 12, 1940 |
| 2,282,006 | Sloan | May 5, 1942 |
| 2,296,066 | Sloan | Sept. 15, 1942 |
| 2,578,605 | Sears et al. | Dec. 11, 1951 |
| 2,663,650 | Iler | Dec. 22, 1953 |